United States Patent
Mori

(10) Patent No.: US 12,261,478 B2
(45) Date of Patent: Mar. 25, 2025

(54) SYSTEM POWER SUPPLY STRUCTURE, BACKUP POWER SUPPLY DEVICE, AND CONTROL METHOD

(71) Applicant: TOYOTA JIDOSHA KABUSHIKI KAISHA, Toyota (JP)

(72) Inventor: Tatsunori Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 7 days.

(21) Appl. No.: 18/194,737

(22) Filed: Apr. 3, 2023

(65) Prior Publication Data

US 2023/0411991 A1    Dec. 21, 2023

(30) Foreign Application Priority Data

Jun. 16, 2022 (JP) .................. 2022-097264

(51) Int. Cl.
*H02J 9/06* (2006.01)
(52) U.S. Cl.
CPC .............. *H02J 9/061* (2013.01); *H02J 9/068* (2020.01)

(58) Field of Classification Search
CPC .... H02J 9/061; H02J 9/068; H02J 9/06; H02J 7/0063; H02J 7/007182; H02J 7/34; H02M 3/04
See application file for complete search history.

(56) References Cited

U.S. PATENT DOCUMENTS

2022/0166249 A1* 5/2022 Shindo ................. B60R 16/033
2022/0294254 A1* 9/2022 Morita ............. H02J 7/007182

FOREIGN PATENT DOCUMENTS

JP    2020-204410 A    12/2020

* cited by examiner

*Primary Examiner* — Lincoln D Donovan
*Assistant Examiner* — Alex W Lam
(74) *Attorney, Agent, or Firm* — Oblon, McClelland, Maier & Neustadt, L.L.P.

(57) ABSTRACT

A system power supply structure comprising: a power supply source; a plurality of systems each requiring a predetermined functional safety; and a plurality of relays inserted between the power supply source and the plurality of systems, wherein a system requiring the same functional safety among the plurality of systems is connected in parallel to the same relay among the plurality of relays.

4 Claims, 10 Drawing Sheets

< BACKUP READY CONTROL >

< BACKUP CONTROL >

< BACKUP READY CONTROL >

< BACKUP CONTROL >

SYSTEM POWER SUPPLY STRUCTURE, BACKUP POWER SUPPLY DEVICE, AND CONTROL METHOD

CROSS-REFERENCE TO RELATED APPLICATION

This application claims priority to Japanese Patent Application No. 2022-097264 filed on Jun. 16, 2022 incorporated herein by reference in its entirety.

BACKGROUND

1. Technical Field

The present disclosure relates to a power supply structure including a plurality of systems, a backup power supply device that controls the system power supply structure, and a control method.

2. Description of Related Art

Japanese Unexamined Patent Application Publication No. 2020-204410 (JP 2020-204410 A) discloses a backup power supply device capable of efficiently utilizing a backup power supply for a system that controls switching of a shift range. In the backup power supply device described in JP 2020-204410 A, in the case where a battery failure is detected, when a shift instruction to shift the shift range to a parking (P) range is determined to be made by a user based on an instruction signal from a monitor circuit, power supply from the backup power supply to a shift control unit is started and the shift control unit is instructed to shift the shift range to the P range.

SUMMARY

When a plurality of systems requiring a redundant power supply configuration is mounted, a structure in which a dedicated relay for supply to a redundant power supply is provided for each system and backup control is individually executed has an issue that the size and cost of a housing of the backup power supply device increase. Further, when a system is added to the above structure, an interface, a control circuit, and the like of the backup power supply device need to be changed or added each time, and there remains an issue in the scalability of the system. Therefore, there is room for improvement in the power supply structure of the systems requiring a redundant power supply configuration.

The present disclosure has been made in view of the above issues. An object of the present disclosure is to provide a power supply structure and the like of a system capable of achieving both suppression of an increase in the size and cost of a housing and improvement in scalability of the system.

In order to solve the above issues, an aspect of the present disclosure is a system power supply structure including: a power supply source; a plurality of systems, in each of which a predetermined functional safety is required; and a plurality of relays inserted between the power supply source and the systems. Systems for which the same functional safety is required among the systems are connected in parallel to the same relay among the relays.

The present disclosure can provide a power supply structure and the like of a system capable of achieving both suppression of an increase in the size and cost of the housing and improvement in the scalability of the system.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

The power supply structure according to the plurality of systems of the present disclosure receives power supply from a power supply source via one relay for two or more of the plurality of systems in which the same functional safety is required. With this structure, it is possible to achieve both suppression of an increase in the size and cost of the housing and improvement in the system expandability.

Hereinafter, embodiments of the present disclosure will be described in detail with reference to the drawings.

First Embodiment

System Power Supply Structure

Figure 1:
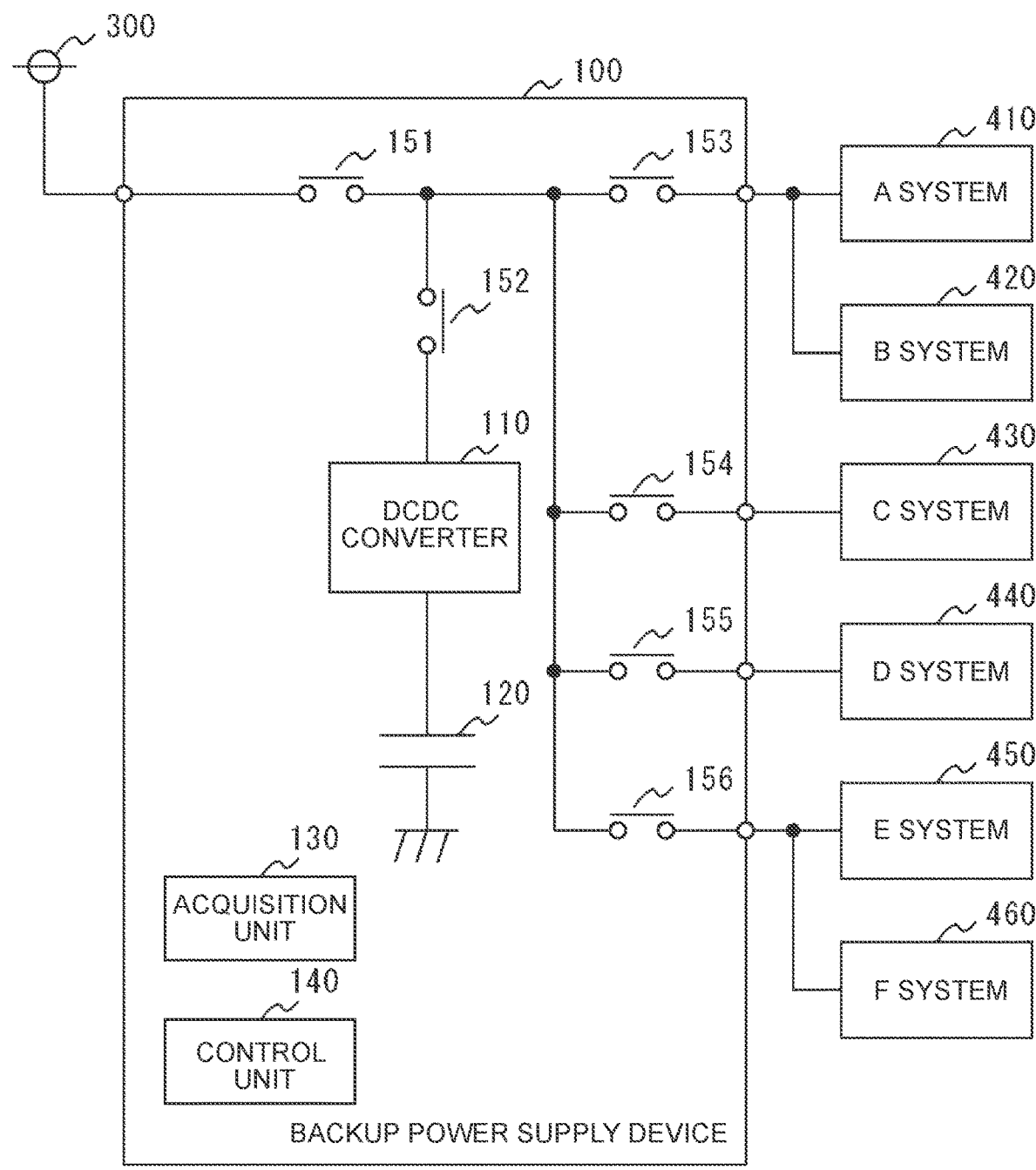
FIG. 1 is a schematic view of a system power supply structure according to a first embodiment.

FIG. 1 is a schematic diagram of a system power supply structure 10 according to a first embodiment of the present disclosure. The system power supply structure illustrated in FIG. 1 includes a backup power supply device 100 and a plurality of systems 410 to 460. The system power supply structure 10 can be mounted on, for example, a vehicle.

The plurality of systems 410 to 460 is a system that requires a redundant power supply configuration (for example, an autonomous driving system in the case of a vehicle). Each of the plurality of systems 410 to 460 is required to have a predetermined functional safety in advance. In the present embodiment, the functional safety required for the A system 410 and the functional safety required for the B system 420 are the same, and the functional safety required for the E system 450 and the functional safety required for the F system 460 are the same.

In the present system power supply structure 10, instead of providing individual relays for each system as in the conventional structure, a configuration is adopted in which two or more systems having the same required functional safety are connected so that power can be supplied together by one relay (described later). This arrangement allows the terminals, the communication interface (UF), and the control to be grouped together in required functional safety units. This structure can suppress an increase in the number of terminals, an increase in cost, and an increase in size. This structure also allows multiple systems with the same functional safety requirements to be controlled by a single relay. Therefore, this structure does not require a large-scale hardware change such as the backup power supply device 100, and can be suppressed to a degree of a software change such as a constant change. Thus, the scalability of the system is improved.

Backup Power Supply Device

The system power supply structure 10 according to the above-described first embodiment can effectively exhibit the functions of the structure by performing characteristic backup control using the backup power supply device 100.

The backup power supply device 100 is a power supply device (secondary power supply) for backing up power from the plurality of systems 410 to 460 when an abnormality occurs in the power supply from the first power supply source 300 to the plurality of systems 410 to 460 due to, for example, a power supply failure of the first power supply source 300 that is a main power supply (primary power supply). The first power supply source 300 is, for example, a secondary battery such as a lithium-ion battery configured to be chargeable and dischargeable.

The backup power supply device 100 according to the first embodiment illustrated in FIG. 1 includes a DCDC converter 110, a second power supply source 120, an acquisition unit 130, a control unit 140, an input relay 151, a DDC relay 152, and a plurality of output relays 153 to 156.

The second power supply source 120 is, for example, a secondary battery such as a lithium-ion battery configured to be chargeable and dischargeable, or a power storage element such as a capacitor. The second power supply source 120 is connected to DCDC converter 110 such that the power of the first power supply source 300 can be charged and the power stored therein can be discharged from the plurality of systems 410 to 460.

DCDC converter 110 is a charge and discharge circuit (power converter) for converting power input from the first power supply source 300 into power of a predetermined voltage, outputting the power to the second power supply source 120, converting power input from the second power supply source 120 into power of a predetermined voltage, and outputting the power to the plurality of systems 410 to 460. DCDC converter 110 can charge the second power supply source 120 with the power supplied from the first power supply source 300 via the input relay 151 and DDC relay 152 based on an instruction (such as a voltage command value) from the control unit 140. DCDC converter 110 may provide the power (backup power) stored in the second power supply source 120 to the plurality of systems 410 to 460 via DDC relays 152 and the plurality of output relays 153 to 156.

The input relay 151, DDC relay 152, and the plurality of output relays 153 to 156 are switching elements capable of switching between the electrically conductive/disconnectable states based on an instruction from the control unit 140. As the relays 151 to 156, an exciting mechanical relay, a semiconductor relay using a field-effect transistor (MOSFET), or the like can be used.

One terminal of the input relay 151 is connected to the first power supply source 300, and the other terminal thereof is connected to one terminal of DDC relay 152 and the plurality of output relays 153 to 156, respectively. The input relay 151 is a relay (first relay) for switching the power input state from the first power supply source 300. The other terminal of the output relay 153 is connected to the A system 410 and the B system 420 having the same function safety request (terminal sharing). The other terminal of the output relay 154 is connected to the C system 430. The other terminal of the output relay 155 is connected to the D system 440. The other terminal of the output relay 156 is connected to the E system 450 and the F system 460 having the same function safety request (terminal sharing). The output relays 153 to 156 are relays (second relays) for switching the power output states from the plurality of systems 410 to 460. The other terminal of DDC relays 152 is connected to DCDC converter 110. DDC relay 152 is a relay (third relay) for connecting DCDC converter 110 (charge and discharge circuits) to a connection point between the input relay 151 (first relay) and the output relays 153 to 156 (second relay).

The acquisition unit 130 acquires the voltage (primary system voltage) of the first power supply source 300 input to the backup power supply device 100. The voltage of the first power supply source 300 can be obtained from a detection value of a voltage sensor included in the acquisition unit 130 itself or in another configuration. The voltage of the first power supply source 300 acquired by the acquisition unit 130 is output (notified) to the control unit 140.

The control unit 140 controls conduction (on) and disconnection (off) of the input relay 151, DDC relay 152, and the plurality of output relays 153 to 156 based on the voltage of the first power supply source 300 acquired by the acquisition unit 130. In addition, the control unit 140 can control the charging and discharging of the second power supply source 120 by instructing DCDC converter 110 to operate.

Note that some or all of the configuration of the backup power supply device 100 may typically be configured as an electronic control unit (ECU) including a processor, a memory, an input/output interface, and the like. The electronic control unit realizes some or all of the functions of DCDC converter 110, the acquisition unit 130, and the control unit 140 by the processor reading and executing the program stored in the memory.

Control

Referring now further to FIGS. 2 and 3A to FIG. 3C, preferred controls for the system power supply structure 10 performed by the backup power supply device 100 will now be described.

Figure 2:
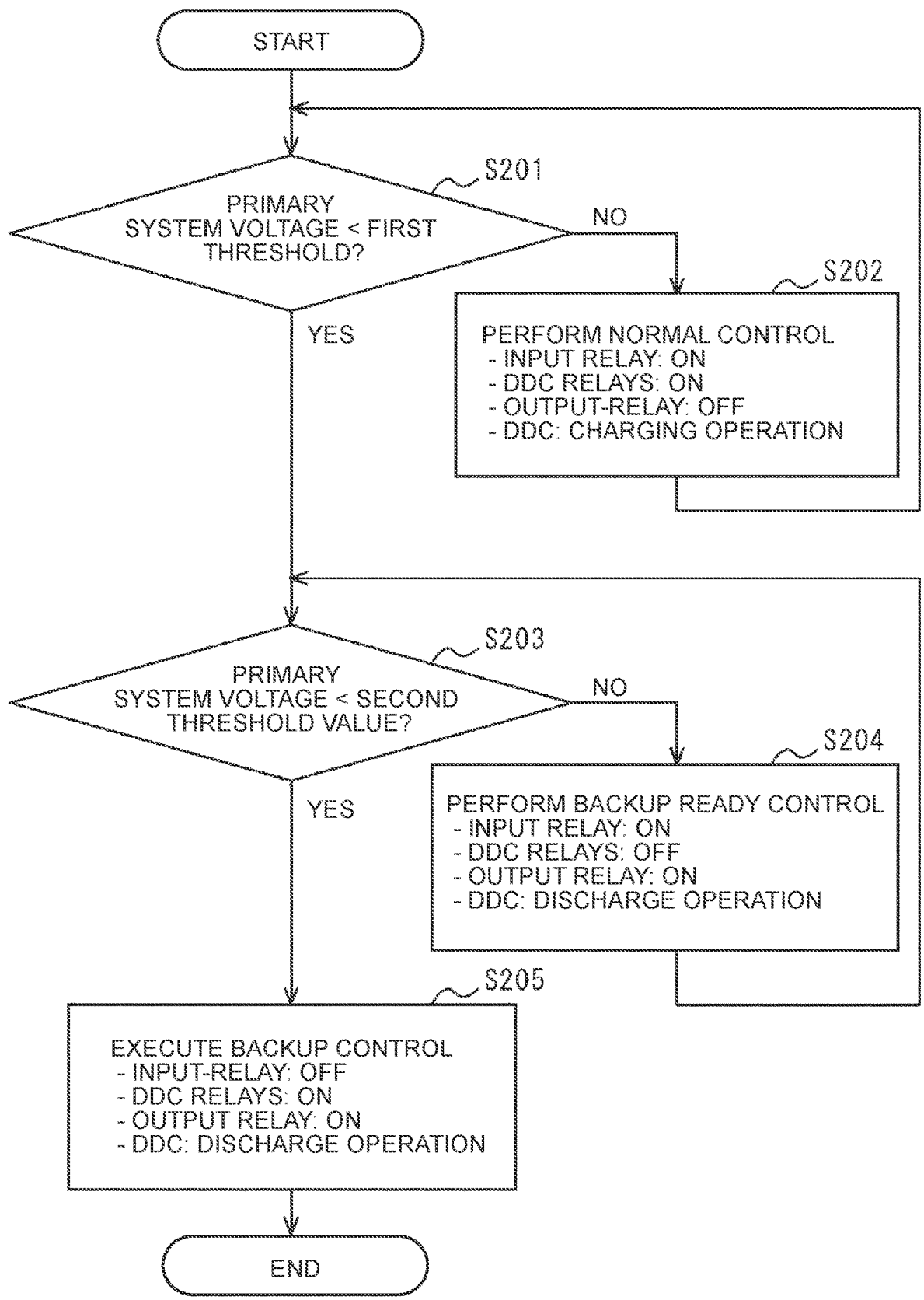
FIG. 2 is a flowchart of a backup control process executed by the backup power supply device according to the first embodiment.
Figure 3A:
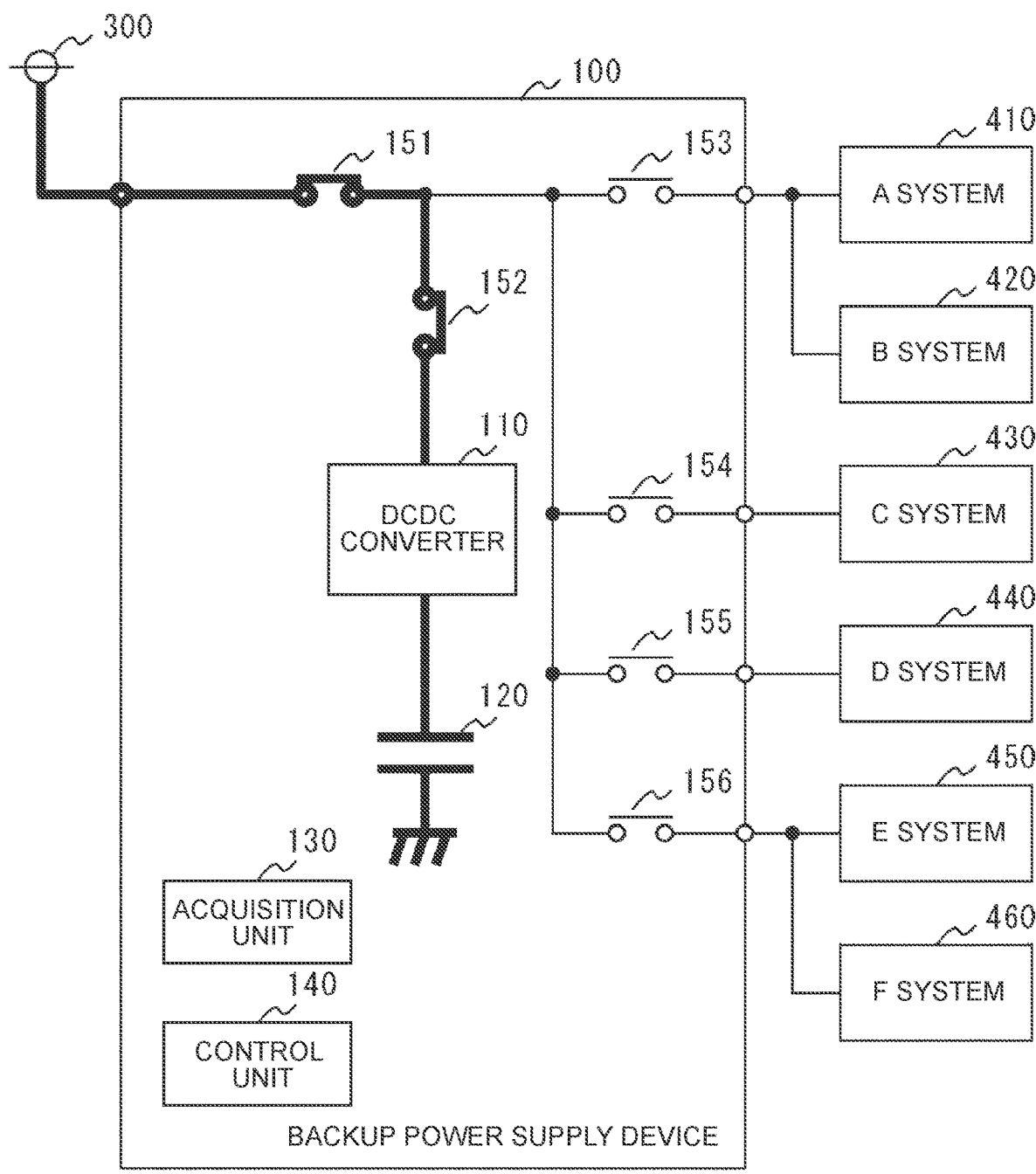
FIG. 3A shows the power-supply status (normal control) of the system power supply structure according to the first embodiment.
Figure 3B:
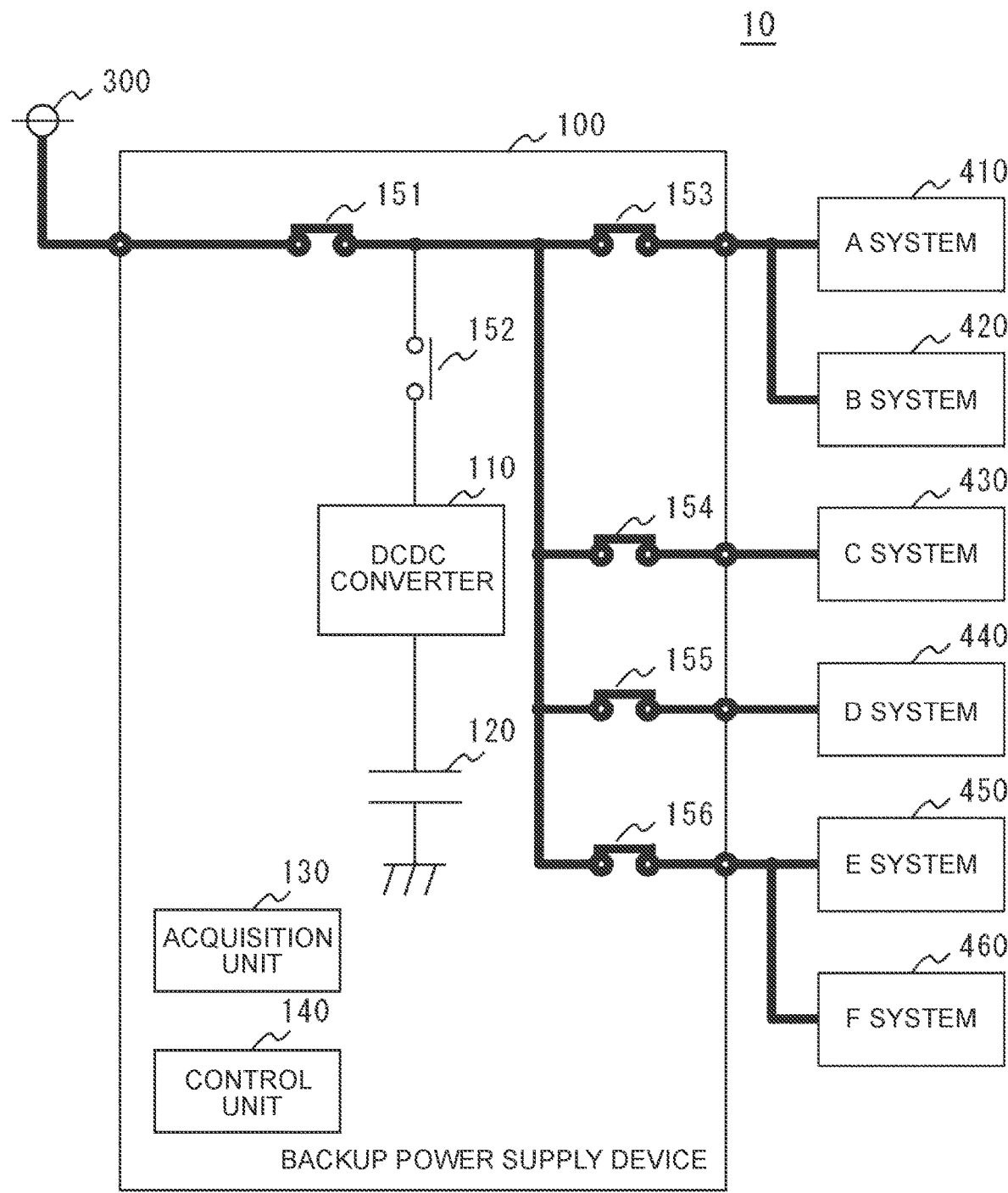
FIG. 3B shows the power-supply status (backup-ready control) of the system power supply structure according to the first embodiment.
Figure 3C:
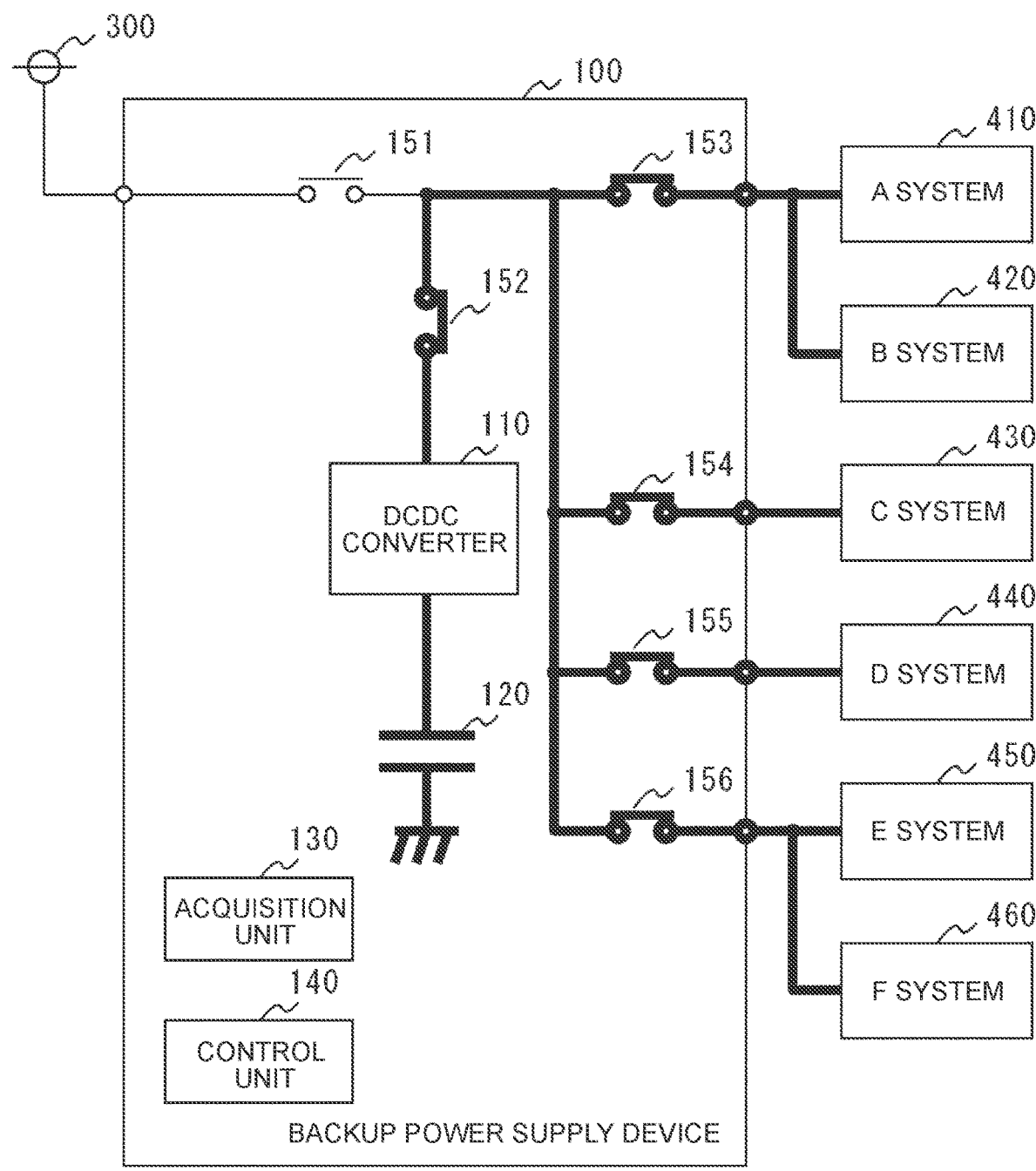
FIG. 3C shows the power-supply status (back-up control) of the system power supply structure according to the first embodiment.

FIG. 2 is a flowchart for explaining a procedure of a backup control process executed by the control unit 140 of the backup power supply device 100. The backup control process illustrated in FIG. 2 is started by, for example, activating a plurality of systems 410 to 460.

S201 of Steps

The control unit 140 determines whether or not the voltage (primary system voltage) of the first power supply source 300 acquired by the acquisition unit 130 is less than the first threshold value. This first threshold value is a predetermined value for determining an indication of a voltage drop. The first threshold value may be, for example, a voltage equal to or lower than the generated voltage of DCDC converter 110 during normal running of the vehicles.

When the control unit 140 determines that the voltage (primary system voltage) of the first power supply source 300 is less than the first threshold value (Step S201: Yes), the process proceeds to Step S203. When the control unit 140 determines that the voltage (primary system voltage) of the first power supply source 300 is equal to or greater than the first threshold value (step S201, No), the process proceeds to step S202.

S202 of Steps

The control unit 140 performs normal control. In this normal control, the input relay 151 is controlled to be in a conductive state (ON), DDC relay 152 is controlled to be in a conductive state (ON), and the plurality of output relays 153 to 156 are controlled to be in a cutoff state (OFF). Further, in the normal control, DCDC converter (DDC) 110 is controlled to be in the charge operation status).

This normal control is control when the so-called primary power supply is normal, in which the power supplied from the first power supply source 300 via the input relay 151 and DDC relay 152 is charged by DCDC converter 110 to the second power supply source 120, as shown in the power supply status of the drawing 3A. Power is supplied to the plurality of systems 410 to 460 in a main power supply path (not shown). When the normal control is performed by the control unit 140, the process proceeds to S201 of steps.

S203 of Steps

The control unit 140 determines whether or not the voltage (primary system voltage) of the first power supply source 300 acquired by the acquisition unit 130 is less than a second threshold value lower than the first threshold value. The second threshold value is a predetermined value for determining that the primary power supply has failed. The second threshold value may be, for example, a voltage that makes normal running of the vehicle difficult. The second threshold value is preferably set to a voltage larger than the minimum operation guarantee voltage of the system to be backed up. When the control unit 140 determines that the voltage (primary system voltage) of the first power supply source 300 is less than the second threshold value (step S203, Yes), the process proceeds to step S205. When the control unit 140 determines that the voltage (primary system voltage) of the first power supply source 300 is equal to or greater than the second threshold value (step S203, No), the process proceeds to step S204.

S204 of Steps

Control unit 140 implements the back-up ready control. In this backup ready control, the input relay 151 is controlled to be in a conductive state (ON), DDC relay 152 is controlled to be in a cutoff state (OFF), and the plurality of output relays 153 to 156 are controlled to be in a conductive state (ON). Further, in the backup ready control, DCDC converter (DDC) 110 is controlled to be in the discharging operation status).

This backup ready control is a control (pass-through control) for supplying power from the first power supply source 300 to the plurality of systems 410 to 460 via the plurality of output relays 153 to 156 while maintaining (preserving) the power of the second power supply source 120 in preparation for an upcoming abnormal situation, since it is still uncertain whether the backup ready control is abnormal or not, as shown in the power supply status of the drawing 3B. The power supply from the plurality of systems 410 to 460 by the main power supply path (not shown) is continued. When the backup ready control is performed by the control unit 140, the process proceeds to S203 of steps.

S205 of Steps

The control unit 140 performs backup control. In this backup control, the input relay 151 is controlled to be in the cutoff state (OFF), DDC relay 152 is controlled to be in the conduction state (ON), and the plurality of output relays 153 to 156 are controlled to be in the conduction state (ON). In the back-up control, DCDC converter (DDC) 110 is controlled to be in the discharging operation status).

This back-up control is control when the so-called primary system power supply, which supplies the power of the second power supply source 120 to the plurality of systems 410 to 460 via DDC relays 152 and the plurality of output relays 153 to 156, is abnormal, as shown in the power supply status of the drawing 3C. Note that power supply from the plurality of systems 410 to 460 via a main power supply path (not shown) is stopped. When the backup control is performed by the control unit 140, the backup control process ends.

As in the above-described processing, the plurality of output relays 153 to 156 are not individually controlled, but the threshold and start timing of the backup power supply are unified, so that it is possible to realize simplified control independent of the backup request from the plurality of systems 410 to 460. Further, it is possible to reduce the cost and improve the reliability.

Second Embodiment

System Power Supply Structure

Figure 4:
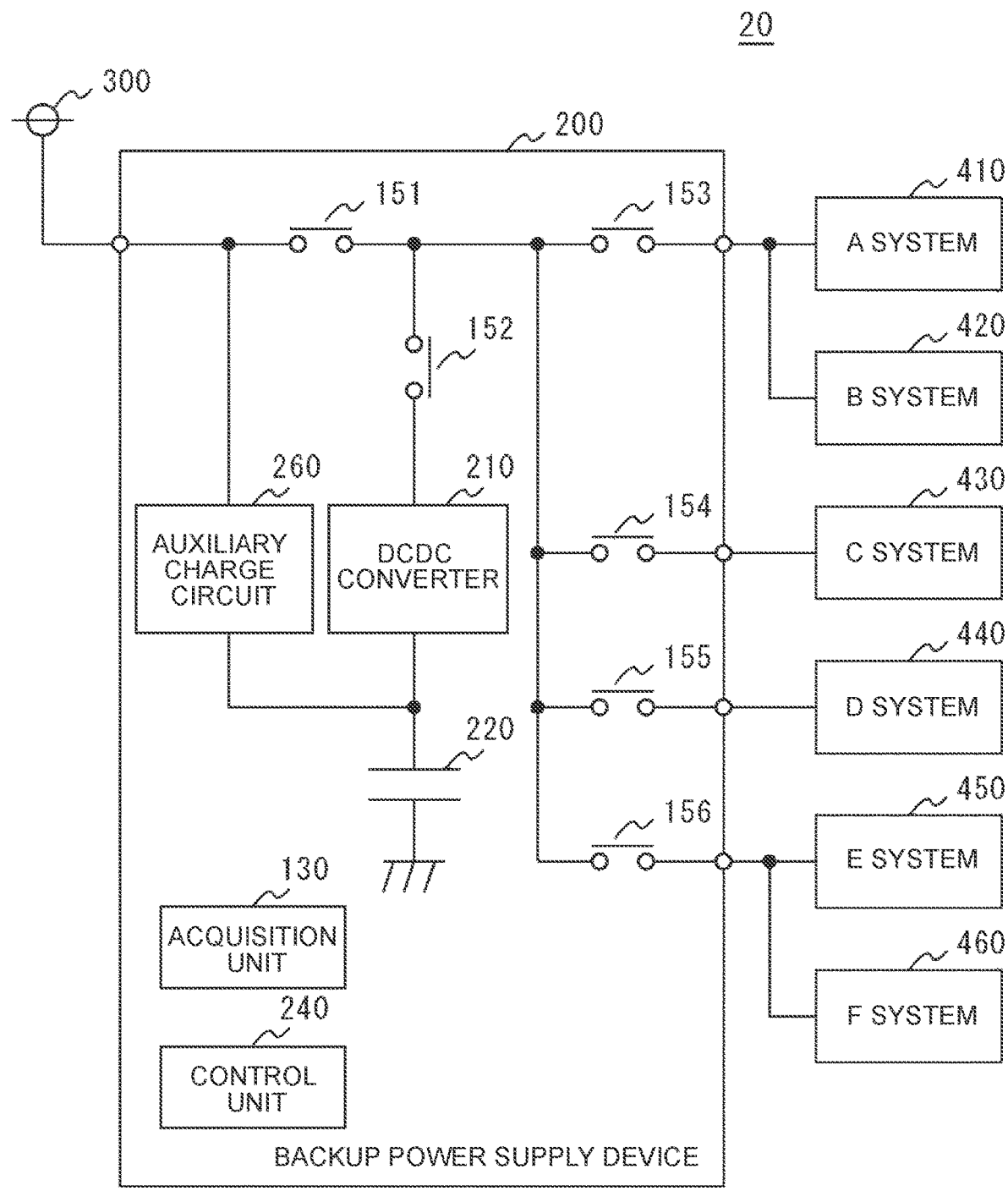
FIG. 4 is a schematic view of a system power supply structure according to a second embodiment.

FIG. 4 is a schematic diagram of a system power supply structure 20 according to a second embodiment of the present disclosure. The system power supply structure 20 illustrated in FIG. 4 includes a backup power supply device 200 and a plurality of systems 410 to 460. The system power supply structure 20 can be mounted on, for example, a vehicle.

The plurality of systems 410 to 460 are systems that require a redundant power supply configuration as in the first embodiment described above. Also in the system power supply structure 20, instead of providing individual relays for each system as in the conventional structure, a configuration is adopted in which required functional safety is connected so that the same two or more systems can be powered together by one relay. This arrangement allows the terminals, the communication interface (I/F) and the control to be grouped together in the required functional safety units. Further, it is possible to suppress an increase in the number of terminals, an increase in the cost, and an increase in the size. In addition, since the function safety request can control the same plurality of systems by one relay, a large-scale hardware change such as the backup power supply device 100 is not required, and the function safety request can be suppressed to the degree of the software change such as the constant change.

Backup Power Supply Device

The system power supply structure 20 according to the second embodiment described above can effectively exhibit the functions of the structure by performing the characteristic backup control using the backup power supply device 200.

The backup power supply device 200 is a power supply device (secondary power supply) for backing up and supplying power from the plurality of systems 410 to 460 when an abnormality occurs in the power supply from the first power supply source 300 to the plurality of systems 410 to 460 due to, for example, a power supply failure of the first power supply source 300 which is a main power supply (primary power supply). The first power supply source 300 is, for example, a secondary battery such as a lithium-ion battery configured to be chargeable and dischargeable.

The backup power supply device 200 according to the second embodiment illustrated in FIG. 4 includes a DCDC converter 210, a second power supply source 220, an acquisition unit 130, a control unit 240, an auxiliary charge circuit 260, an input relay 151, a DDC relay 152, and a plurality of output relays 153 to 156.

The second power supply source 220 is, for example, a secondary battery such as a lithium-ion battery configured to be chargeable and dischargeable, or a power storage element such as a capacitor. The second power supply source 220 is connected to the auxiliary charge circuit 260 so that the power of the first power supply source 300 can be charged. The second power supply source 220 is also connected to DCDC converter 210 so that the power of the first power supply source 300 can be charged and the power stored therein can be discharged from the plurality of systems 410 to 460.

DCDC converter 210 is a charge and discharge circuit (power converter) for converting power input from the first power supply source 300 into power of a predetermined voltage, outputting the power to the second power supply source 220, converting the power input from the first power supply source 300 into power of a predetermined voltage, outputting the power to the plurality of systems 410 to 460, converting the power input from the second power supply source 220 into power of a predetermined voltage, and outputting the power to the plurality of systems 410 to 460. DCDC converter 210 can charge the second power supply source 220 with the power supplied from the first power supply source 300 via the input relay 151 and DDC relay 152 based on an instruction (such as a voltage command value) from the control unit 240. DCDC converter 210 can supply the electric power output from the auxiliary charge circuit 260 and the electric power (backup electric power) stored in the second power supply source 120 to the plurality of systems 410 to 460 via DDC relays 152 and the plurality of output relays 153 to 156.

The input relay 151 (first relay), DDC relay (third relay) 152, and the plurality of output relays (second relay) 153 to 156 are switching elements that can switch the electrically conductive/disconnectable state based on an instruction from the control unit 240, as in the first embodiment described above. The connecting statuses of the input-relay 151, DDC relay 152, and the output relays 153 to 156 are as described above.

As in the first embodiment described above, the acquisition unit 130 acquires the voltage (primary system voltage) of the first power supply source 300 input to the backup power supply device 100. The voltage of the first power supply source 300 acquired by the acquisition unit 130 is output (notified) to the control unit 240.

The auxiliary charge circuit 260 is a charging circuit having an auxiliary role for directly inputting the power of the first power supply source 300 and outputting the power to the second power supply source 220. For example, DCDC converter can be used for the auxiliary charge circuit 260. The auxiliary charge circuit 260 may charge the second power supply source 220 with the power supplied from the first power supply source 300 based on an instruction (such as a voltage command value) from the control unit 240.

The control unit 240 controls the conduction/disconnection status of the input relay 151, DDC relay 152, and the plurality of output relays 153 to 156 based on the voltage of the first power supply source 300 acquired by the acquisition unit 130. In addition, the control unit 240 can control the charging and discharging of the second power supply source 220 by instructing DCDC converter 210 and the auxiliary charge circuit 260 to operate.

Note that some or all of the configuration of the backup power supply device 200 may typically be configured as an electronic control unit (ECU) including a processor, a memory, an input/output interface, and the like. The electronic control unit realizes some or all of the functions of DCDC converter 210, the acquisition unit 130, the control unit 240, and the auxiliary charge circuit 260 by the processor reading and executing the programs stored in the memory.

Control

Referring now further to FIG. 5 and FIGS. 6A to 6C, preferred controls for the system power supply structure 20 performed by the backup power supply device 200 will be described.

Figure 5:
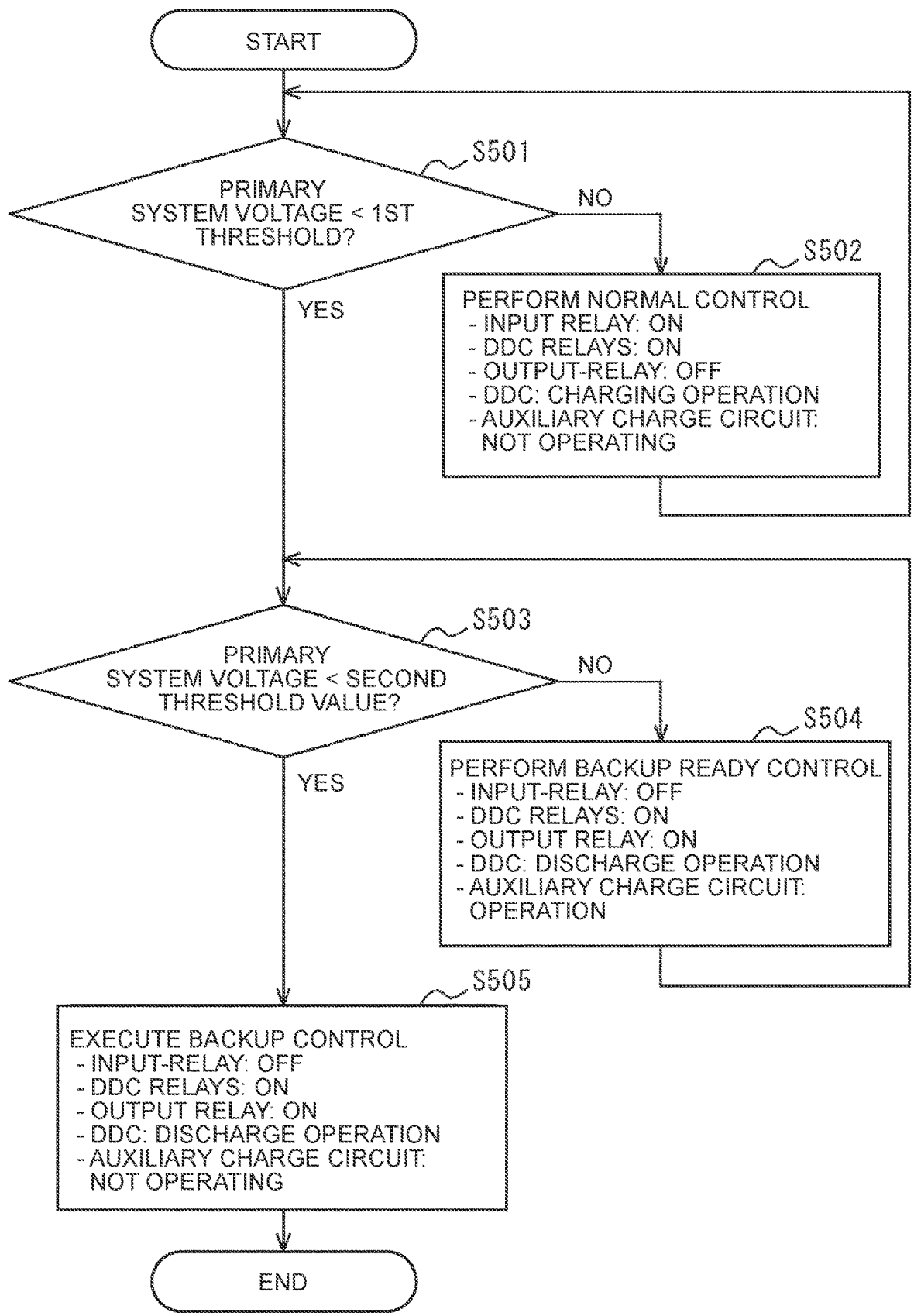
FIG. 5 is a flowchart of a backup control process executed by the backup power supply device according to the second embodiment.

FIG. 5 is a flowchart for explaining a procedure of a backup control process executed by the control unit 240 of the backup power supply device 200. The backup control process illustrated in FIG. 5 is started by, for example, activating a plurality of systems 410 to 460.

S501 of Steps

The control unit 240 determines whether or not the voltage (primary system voltage) of the first power supply source 300 acquired by the acquisition unit 130 is less than the first threshold value. This first threshold value is as described above. When the control unit 240 determines that the voltage (primary system voltage) of the first power supply source 300 is less than the first threshold value (Step S501: Yes), the process proceeds to Step S503. When the control unit 240 determines that the voltage (primary system voltage) of the first power supply source 300 is equal to or greater than the first threshold value (step S501, No), the process proceeds to step S502.

S502 of Steps

The control unit 240 performs normal control. In this normal control, the input relay 151 is controlled to be in a conductive state (ON), DDC relay 152 is controlled to be in a conductive state (ON), and the plurality of output relays 153 to 156 are controlled to be in a cutoff state (OFF). Further, in the normal control, DCDC converter (DDC) 210 is controlled to be in the charge operation status). In the normal control, the auxiliary charge circuit 260 is controlled to be in a non-operating state.

This normal control is control when the so-called primary system power supply is normal, in which the power supplied from the first power supply source 300 is charged to the second power supply source 220 by DCDC converter 210 via the input relay 151 and DDC relay 152, as shown in the power supply status of the drawing 6A. Power is supplied to the plurality of systems 410 to 460 in a main power supply path (not shown). When the normal control is performed by the control unit 240, the process proceeds to S501 of steps.

S503 of Steps

The control unit 240 determines whether or not the voltage (primary system voltage) of the first power supply source 300 acquired by the acquisition unit 130 is less than a second threshold value lower than the first threshold value. This second threshold value is as described above. When the control unit 240 determines that the voltage (primary system voltage) of the first power supply source 300 is less than the second threshold value (Step S503: Yes), the process proceeds to Step S505. When the control unit 240 determines that the voltage (primary system voltage) of the first power supply source 300 is equal to or greater than the second threshold value (step S503, No), the process proceeds to step S504.

Steps of S504

Control unit 240 implements the back-up ready control. In the backup ready control, the input relay 151 is controlled to be in the cutoff state (OFF), DDC relay 152 is controlled to be in the conduction state (ON), and the plurality of output relays 153 to 156 are controlled to be in the conduction state (ON). Further, in the backup ready control, DCDC converter (DDC) 210 is controlled to be in the discharging operation status). In the backup ready control, the auxiliary charge circuit 260 is controlled to be in an operating state.

Figure 6A:
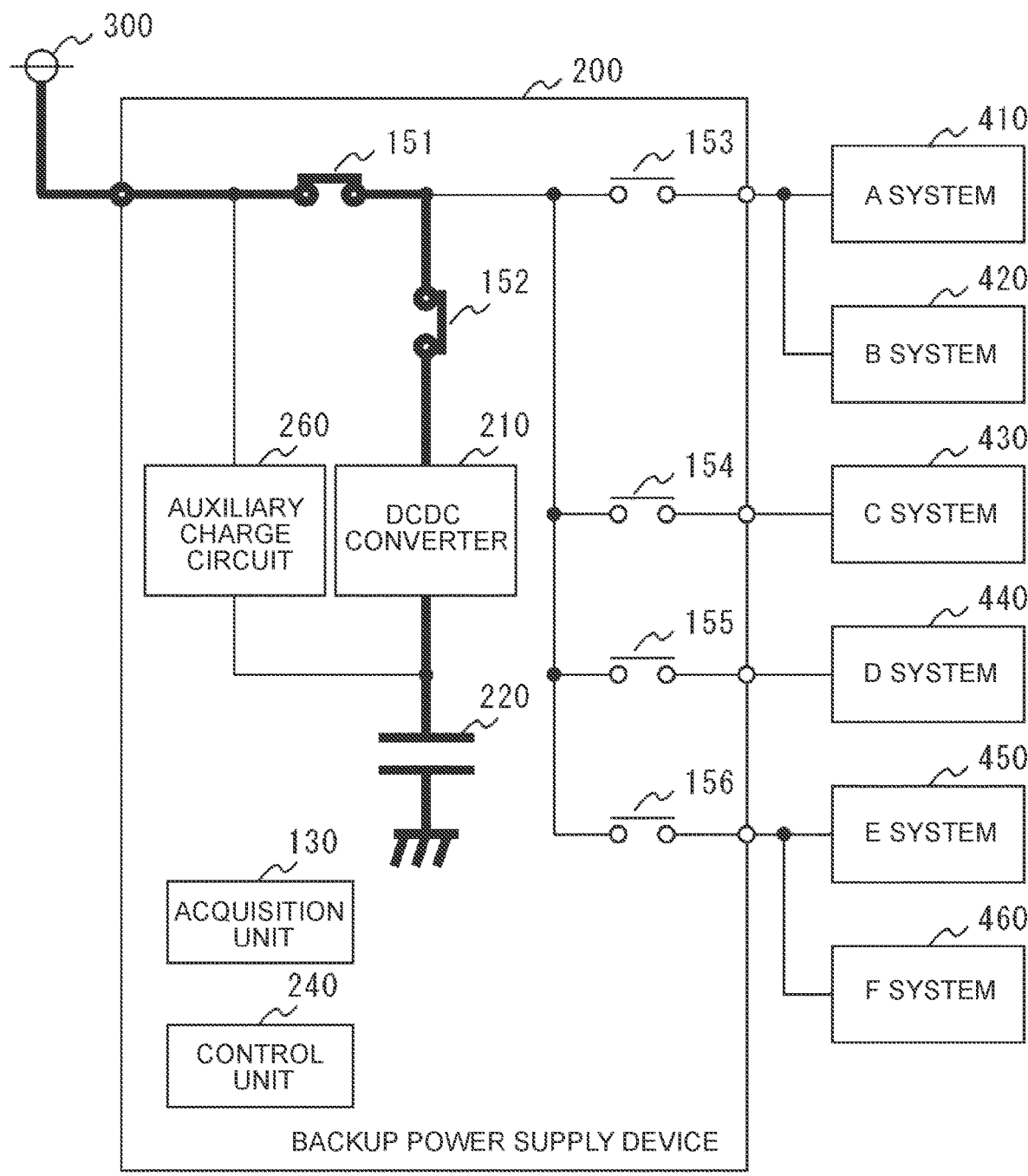
FIG. 6A shows the power-supply status (normal control) of the system power supply structure according to the second embodiment.
Figure 6B:
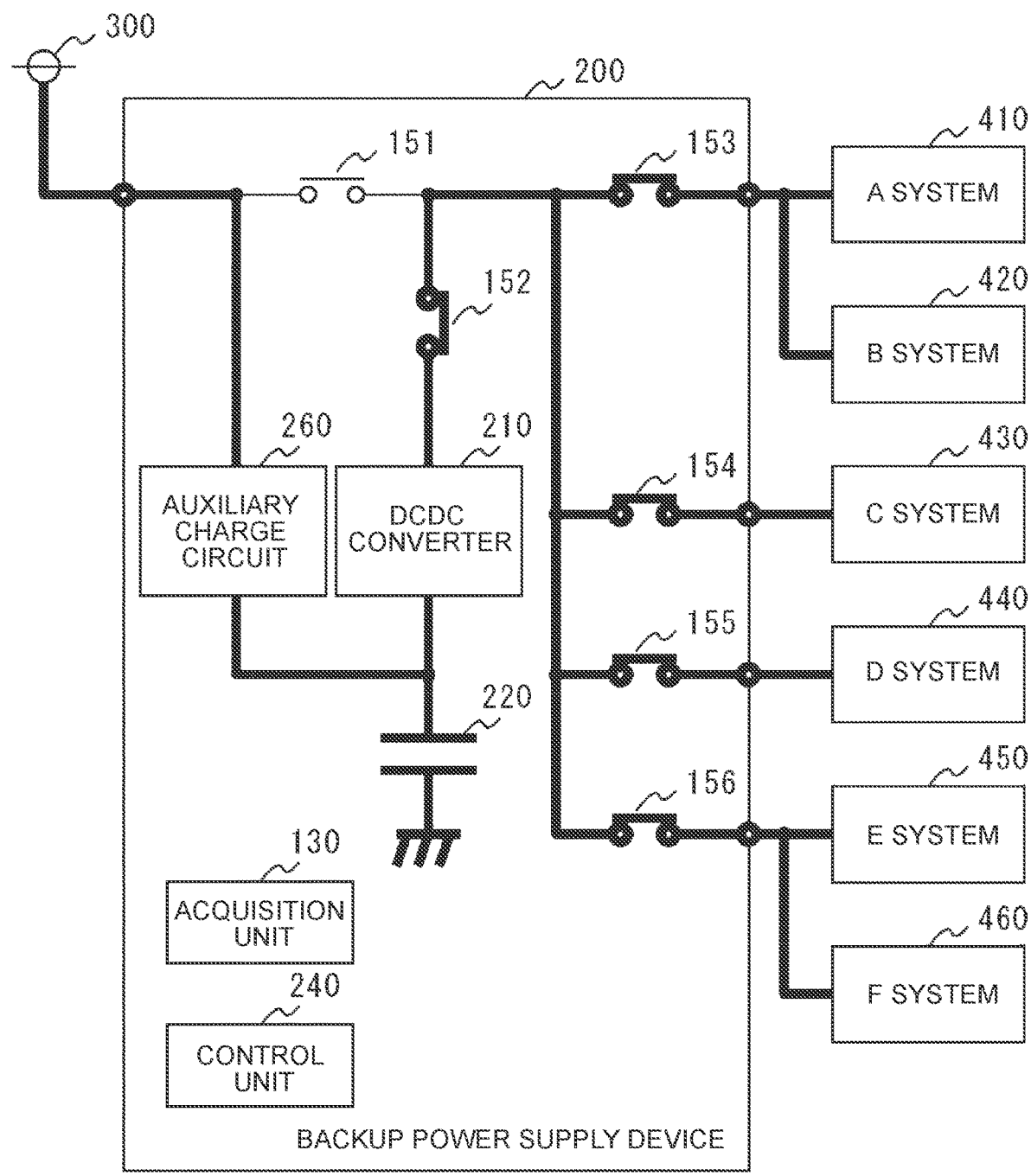
FIG. 6B shows the power-supply status (backup-ready control) of the system power supply structure according to the second embodiment.
Figure 6C:
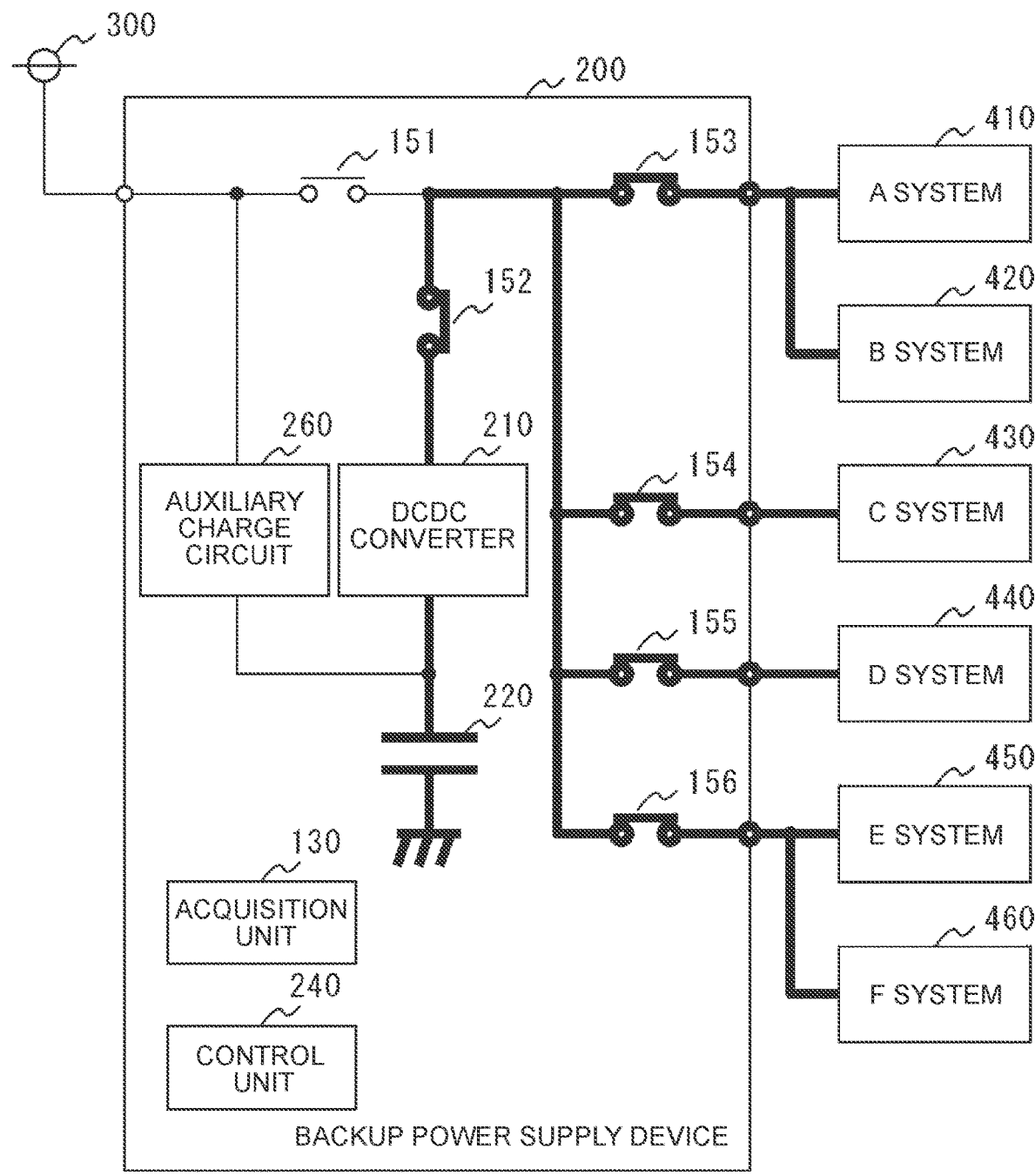
FIG. 6C shows the power supply status (back-up control) of the system power supply structure according to the second embodiment.

This backup ready control is controlled to supply the power of the second power supply source 220 (the power of the first power supply source 300) from the plurality of systems 410 to 460 via DDC relays 152 and the plurality of output relays 153 to 156 while suppressing the decrease in the power of the second power supply source 220 by charging through the auxiliary charge circuit 260 in preparation for an upcoming abnormal situation, as indicated by the power supply status of FIG. 6B. The power supply from the plurality of systems 410 to 460 by the main power supply path (not shown) is continued. When the backup ready control is performed by the control unit 240, the process proceeds to S503 of steps.

Steps of S505

The control unit 140 performs backup control. In this backup control, the input relay 151 is controlled to be in the cutoff state (OFF), DDC relay 152 is controlled to be in the conduction state (ON), and the plurality of output relays 153 to 156 are controlled to be in the conduction state (ON). In the back-up control, DCDC converter (DDC) 210 are controlled to be discharging operations). In the backup control, the auxiliary charge circuit 260 is controlled to be in a non-operating state.

This back-up control is control when the so-called primary system power supply is abnormal, which supplies the power of the second power supply source 220 to the plurality of systems 410 to 460 via DDC relays 152 and the plurality of output relays 153 to 156, as shown in the power supply status of the drawing 6C. Since the primary power supply is abnormal, the auxiliary charge circuit 260 is not operated. Note that power supply from the plurality of systems 410 to 460 via a main power supply path (not shown) is stopped. When the backup control is performed by the control unit 240, the backup control process ends.

As in the above-described processing, the plurality of output relays 153 to 156 are not individually controlled, but by unifying the threshold and the start timing of the backup power supply, it is possible to realize the simplified control independent of the backup request from the plurality of systems 410 to 460. Further, it is possible to reduce the cost and improve the reliability.

Operations and Effects

As described above, according to the system power supply structure and the like according to the embodiments of the present disclosure, redundant power supplies existing for each system are integrated, and the output circuits and the control which are individual requirements are unified by the system. This makes it possible to collectively control the supply of the backup power to the plurality of systems based on the voltage state of the main power supply source.

An embodiment of the present disclosure has been described above. The present disclosure can be viewed as a system power supply structure, a backup power supply device, a control method executed by a backup power supply device including a processor and a memory, a control program for executing the control method, a computer-readable non-transitory storage medium storing the control program, and the like.

The system power supply structure of the present disclosure can be used for a vehicle equipped with a plurality of systems that require a redundant power supply configuration.

What is claimed is:

1. A backup power supply device that supplies power to a plurality of systems, the backup power supply device comprising:
   a first relay that switches a power input state from a first power supply source;
   a second relay that switches a power output state to the systems;
   a second power supply source that is chargeable with power from the first power supply source via the first relay;
   a charge and discharge circuit that controls charge and discharge of the second power supply source;
   a third relay that connects the charge and discharge circuit to a connection point between the first relay and the second relay;
   a control unit that controls turning on and off of the first relay, the second relay, and the third relay; and
   an acquisition unit that acquires voltage of the first power supply source,
   wherein when the voltage of the first power supply source is equal to or more than a first threshold value, the control unit controls the first relay and the second relay to turn on and the third relay to turn off so as to charge the second power supply source with power from the first power supply source, when the voltage of the first power supply source is less than the first threshold value and equal to or more than a second threshold value, the control unit controls the first relay and the third relay to turn on and the second relay to turn off so as to supply power from the first power supply source to the systems, and when the voltage of the first power supply source is less than the second threshold value, the control unit controls the first relay to turn off and the second relay and the third relay to turn on so as to supply power from the second power supply source to the systems.

2. A backup power supply device that supplies power to a plurality of systems, the backup power supply device comprising:
   a first relay that switches a power input state from a first power supply source;
   a second relay that switches a power output state to the systems;
   a second power supply source that is chargeable with power from the first power supply source via the first relay;
   a charge and discharge circuit that controls charge and discharge of the second power supply source;
   a third relay that connects the charge and discharge circuit to a connection point between the first relay and the second relay;
   a control unit that controls turning on and off of the first relay, the second relay, and the third relay;
   an auxiliary charge circuit that is able to charge the second power supply source with power from the first power supply source without the first relay; and
   an acquisition unit that acquires voltage of the first power supply source, wherein when the voltage of the first power supply source is equal to or more than a first threshold value, the control unit controls the first relay and the second relay to turn on and the third relay to turn off so as to charge the second power supply source with power from the first power supply source, when the voltage of the first power supply source is less than the first threshold value and equal to or more than a second threshold value, the control unit controls the first relay to turn off and the second relay and the third relay to turn on and activates the auxiliary charge circuit so as to supply power from the first power supply source and the second power supply source to the systems, and when the voltage of the first power supply source is less than the second threshold value, the control unit controls the first relay to turn off and the second relay and the third relay to turn on so as to supply power from the second power supply source to the systems without activating the auxiliary charge circuit.

3. The backup power supply device according to claim 1, wherein:
   the second relay is composed of a plurality of relays; and
   a predetermined number of the systems are connected in parallel to a same relay among the relays.

4. The backup power supply device according to claim 2, wherein:
   the second relay is composed of a plurality of relays; and
   a predetermined number of the systems are connected in parallel to a same relay among the relays.

* * * * *